INVENTOR.
Carl Byrd

Oct. 29, 1963

C. BYRD 3,109,131

PULSE CONTROLLED SERVO SYSTEM

Filed Sept. 5, 1961

*INVENTOR.*

Carl Byrd

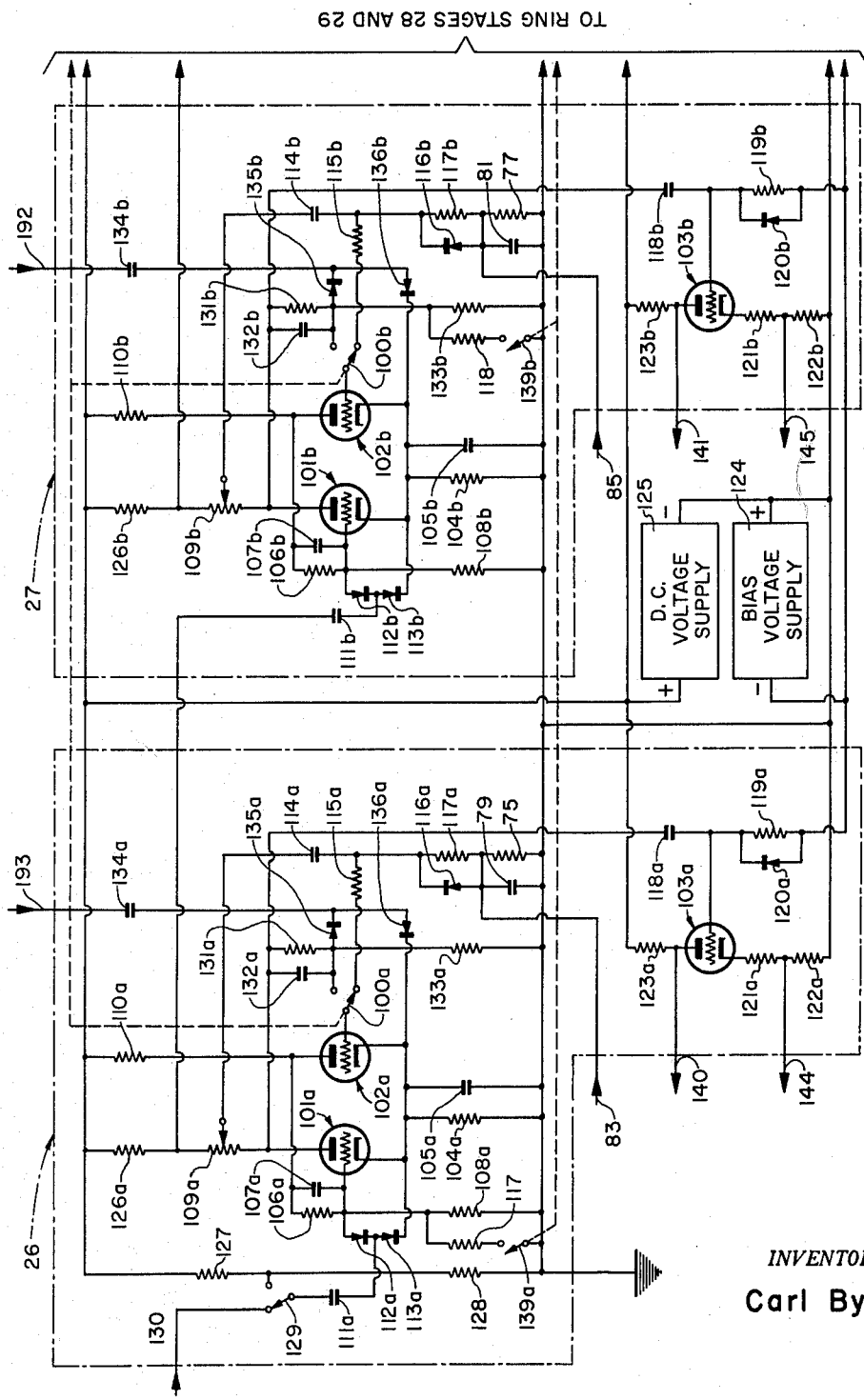

INVENTOR.
Carl Byrd

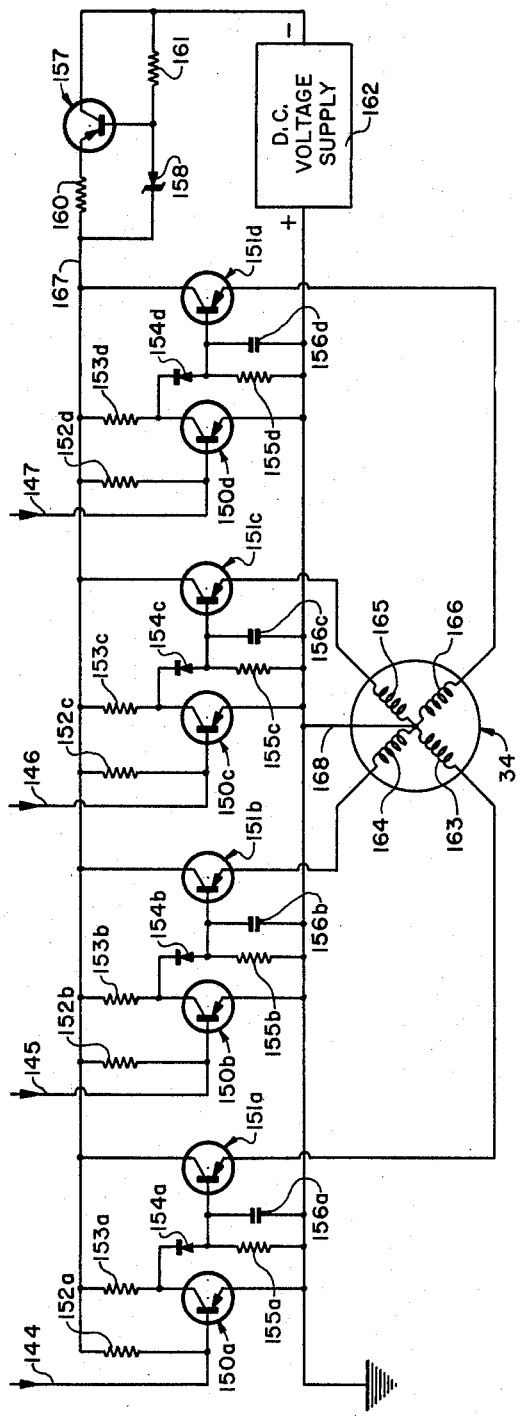
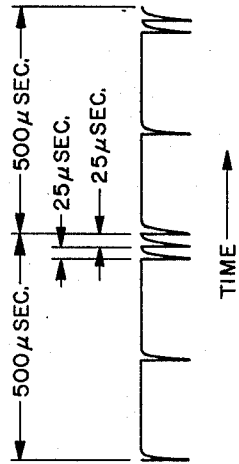
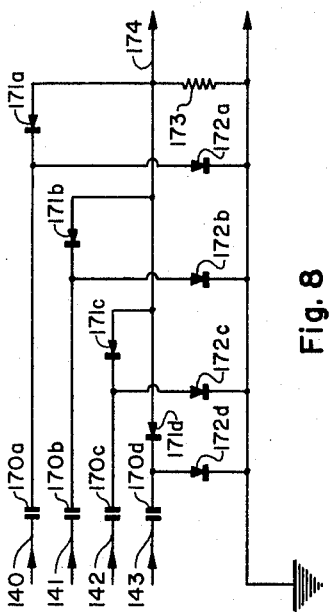
Fig. 7
Fig. 9
Fig. 8
INVENTOR.
Carl Byrd

INVENTOR.
Carl Byrd

_United States Patent Office_ 3,109,131
Patented Oct. 29, 1963

3,109,131
PULSE CONTROLLED SERVO SYSTEM
Carl Byrd, 2274 Logan Blvd., Chicago, Ill., assignor of one-fourth to Richard S. Kaszuba, Norridge, Ill.
Filed Sept. 5, 1961, Ser. No. 135,858
14 Claims. (Cl. 318—138)

This invention relates to control systems generally, and more specifically to a system whereby useful information may be coded in pulse form, said code in pulse form being capable of transmission to a remote point, being capable of being stored by a suitable recording medium for later use, being capable of transmission to several points simultaneously, and by any of these methods of handling said code in pulse form, may be decoded, amplified and converted into either useful information or work, said information or work being a useful reproduction of the input information.

This invention is particularly suited, but not limited, to the control of one or more synchronous type motors. In this type of operation this system is capable of providing precise angular information. This system is further capable of amplifying very small input information to high levels of power.

One example of use of this invention controlling a synchronous type motor is the lead screw drive on machine tools where, from recorded information, any number of duplicate pieces are to be machined. Another application of this invention would be precise control of apparatus remote from the point it would be desirable to supply information. Another application would be where a number of actions were desired simultaneously or in sequence and synchronized with other action within the system, but where mechanical connections were undesirable.

Systems of control have been described in the past. Three systems of angular control; the "Selsyn" system, the stepper-type-motor system and the servomotor-type system are well known and widely used. Also well known are the drawbacks and limitations of these systems.

The "Selsyn" system is simple, comparatively inexpensive and capable of power amplification. The electrical nature of the system, however, makes information difficult to code, telemeter or record.

The electrical system of the stepper-type-motor is inherently coded and the electrical disadvantages of the "Selsyn" system are partly overcome. When used in drives requiring reversing, the stepper-motor requires an additional channel of information to determine direction. Further, stepper-motors capable of high power outputs are subject to overthrow and oscillation which must be compensated for, complicating mechanical design and adding to the reversing problem. In addition, stepper-motor outputs are not smooth but subject to cogging, or a series of mechanical pulses during rotation. This cogging effect may be undesirable in many applications.

Servomotor systems operate with feedback, error detection and compensation. While servomotor systems can be built in the high power and high precision range, such systems are complicated, costly, and difficult to maintain.

Objects of this invention are a system whereby the limitations of the above described systems are overcome, and in addition, other useful functions may be obtained.

One object of this invention is a control system whereby a high degree of angular accuracy may be imparted to the output shaft of a synchronous type motor. In addition, when this system is used to control a synchronous type motor, said motor will be under control at all speeds from zero to maximum, being capable of braking and holding.

Another object of this invention is a system whereby useful information such as the rotation of a shaft may be coded in a single series of pulses, and said code pulses may be decoded in such a manner as to cause a synchronous type motor to rotate in either direction, at all speeds from zero to maximum, in accordance with the input information, and further, that all such information be coded in a single series of pulses capable of being transmitted by a single electrical circuit or radio loop, or capable of being recorded on a single channel of a suitable recording medium.

Another object of this invention, when used to control a synchronous type motor, is that the mechanical output of said motor will be essentially smooth and stepless during all speeds of rotation. By "essentially" this is meant: it is recognized that all types of synchronous motors are subject to some degree of pulsing. This pulsing may be minimized greatly by the electrical and mechanical design of the machine. This pulsing in a synchronous type motor, however, is of a much lower magnitude than the cogging associated with stepper-type-motors where at certain speeds the rotor travels beyond the corresponding stator pole, stops and in trying to align itself with the stator pole just overshot, reverses the direction of rotation. "Essentially smooth and stepless" is here meant as a comparison to a synchronous motor supplied by a polyphase alternating current of sinusoidal wave form.

Another object of this invention is a system whereby the above control functions are accomplished by the manner of coding and decoding of the useful information without recourse to mechanical devices or additional channels of electrical information.

Another object of this invention is that coding and decoding equipment is simple.

In order that the principles of this invention may be more clearly explained and understood, reference is made to the following descriptions and accompanying drawings. The system used for purpose of illustration may be broadly classified as a variable, two phase self-synchronous motor control system. It will be apparent, however, from said description and drawings, and appended claims, that the principles of this system are applicable to other multi-phase systems, to the control of more than one motor, and to the control of more than one function. It will also be apparent to those skilled in the art, that a variety of combinations of components and circuits may be substituted without affecting the principles of the system of this invention.

FIGURE 5 is a schematic diagram of two ring stages of the shift ring shown by dotted lines in block form in FIGURE 1.

FIGURE 7 is a schematic diagram of four power amplifiers shown in block form in FIGURE 1.

FIGURE 8 is a schematic diagram of the coding unit shown in block form in FIGURE 1.

FIGURE 9 is a wave form diagram of the output of the coding unit shown in block form in FIGURE 1.

In the system being described, either mechanical motion or a single train of electrical pulses may be used as the input information to the system. The mechanical motion input type system will be described first and the electrical pulse input type system will be described later.

In the first mode of operation to be explained, the input information to this system is assumed to be of a rotary nature, or capable of being converted to a rotary movement by any suitable means, such as a rack and pinion gear set. Such rotary motion may be continuous or non-continuous in either direction, or of an oscillatory nature. In this mode of operation the output of this system may be either electrical code output or rotational output, or both. The electrical code output in the form of pulses is of a nature that may be telemetered to a remote point or recorded on a suitable medium, producing a rotary motion at either a remote point or at a later time by means to be described as part of the system of this invention. All above mentioned rotational outputs will be at a synchronized ratio to the system rotational input; such ratio may be 1:1 or of a higher or lower ratio, as will be explained.

Figure 1:
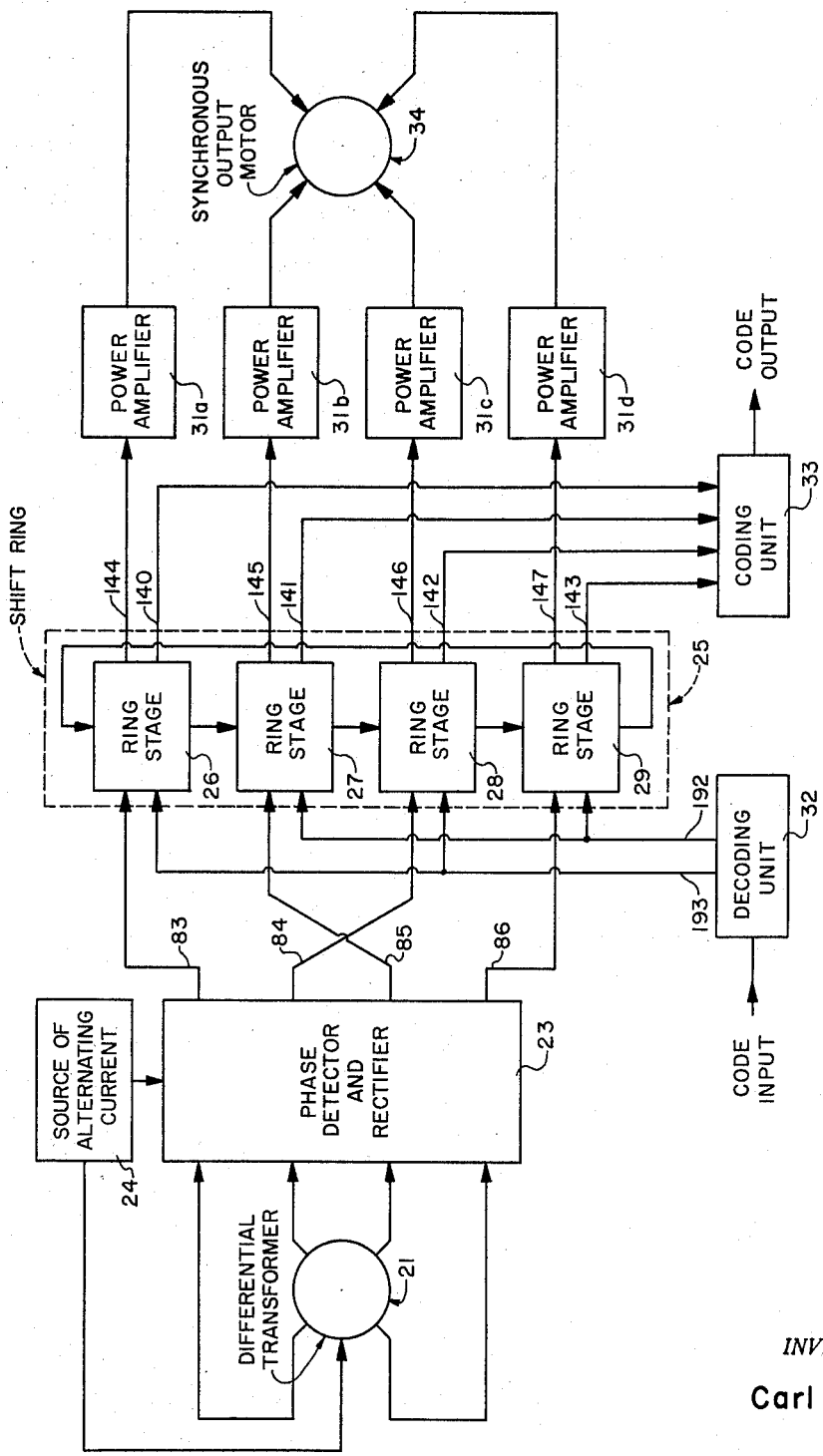
FIGURE 1 is a basic block diagram showing the system where either rotational mechanical motion, or coded electrical pulses, is the input information to the system.

In the block diagram, FIGURE 1, a differential transformer 21 is used to convert rotary movement into electrical outputs. The rotary movement input is imparted to a shaft 22 of the differential transformer 21 and its electrical outputs are fed to a phase detector and rectifier 23. The differential transformer 21 and the phase detector and rectifier 23, are supplied by a common source of alternating current 24.

The outputs of the phase detector and rectifier 23 are fed in proper sequence to a shift ring 25, shown by dotted lines in FIGURE 1, comprised of a plurality of ring stages 26, 27, 28 and 29. The ring stages 26, 27, 28 and 29 are electronic switches capable of two states; "off" and "on," the "on" time of each stage being a function of a timing circuit within the stage. The shift ring 25 is designed so that only one stage at a time may be in the "on" state, and when this stage turns off, the following stage is turned on. Thus, because ring stage 26 follows ring stage 29, a loop is formed and a continuous pattern of switching results. The timing circuits of ring stages 26, 27, 28 and 29 are of such a nature that the normal "on" time of a ring stage is short, but a control signal may be applied that will lengthen the "on" time, the length of the "on" time being proportional to the magnitude of the control signal. Although the shift ring 25 steps in sequence, control signals may be applied to one or more of the ring stages thereof in any desired order. The shift ring 25 may be described as a scanner, continuously sampling its input circuits in sequence and upon finding a signal impressed on an input, dwells or holds at this ring stage before stepping to the next ring stage.

The individual ring stages 26, 27, 28 and 29 of shift ring 25 perform two important functions in the system of this invention. The first function perpetuates the switching action of shift ring 25 in sequence. The second function is to convert the control signals into "on" time, thus controlling the associated power amplifiers 31a, 31b, 31c and 31d. The minimum time any one of the ring stages 26, 27, 28 or 29 may be "on" is a function of the timing circuit of the ring stage, as will be explained. This time is the free running or "shift" time of the stage. The outputs of ring stages 26, 27, 28 or 29 are used to control associated power amplifiers 31a, 31b, 31c or 31d. In the input circuit of each of these power amplifiers is a time delay of such a nature as to hold the power amplifier off for a period of time slightly longer than the free running, or "shift" time of the associated ring stage. Thus, if no signal is imparted to the timing circuit of said ring stage, it switches "off" before the associated power amplifier can turn on. However, if there is a signal imparted to the ring stage timing circuit, the associated power amplifier will be turned on for a period of time equal to the time the ring stage is on, minus the time of the power amplifier time delay circuit.

When the control signal to the timing circuit of an associated ring stage is at maximum, the "on" time of this particular ring stage will also be at maximum. When one ring stage "on" time is maximum, usually the rest of the ring stages will be at minimum "on" time. The ring will shift thru the three minimum "on" time stages at a fast rate and again dwell at the stage of maximum signal for a maximum period of time. When more than one ring stage has a signal impressed upon its timing circuit, the shift ring will dwell at said stages proportionally to the magnitude of the impressed signal. The power amplifiers associated with these ring stages will have "on" times as explained above.

Figure 4:
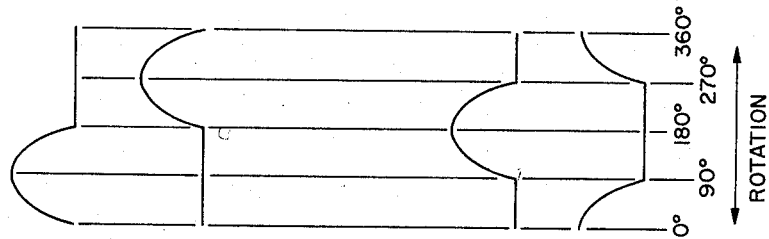
FIGURE 4 is a wave form diagram of the output voltages of the circuitry shown in FIGURE 3.
Figure 10:
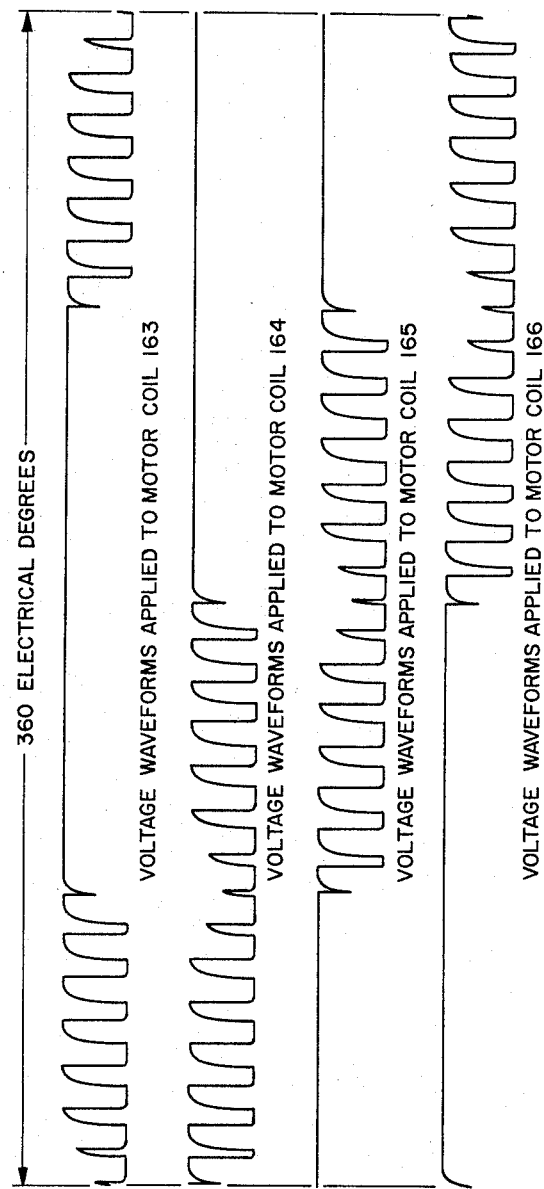
FIGURE 10 is a wave form diagram of the voltages developed across the coils of the synchronous type output motor shown in FIGURE 1.

The "on" time of the said power amplifiers may be used to energize the coils of a synchronous type motor 34. The voltages applied to the motor 34 coils are shown by wave forms in FIGURE 10. While semi-rectangular in shape an average power curve of these wave forms would be similar to the outputs of the phase detector and rectifier 23 shown in FIGURE 4.

The outputs of ring stages 26, 27, 28 and 29 are connected to a coding unit 33 as shown in block form in FIGURE 1. The purpose of the coding unit 33 is to convert the "on" times of ring of ring stages 26, 27, 28 and 29 into a single train of pulses spaced in time so that each pulse corresponds to the turn on of one of the said ring stages. FIGURE 9 is a wave form diagram of a train of pulses developed at the output terminal 174 of the coding unit 33. The pulse train shown in FIGURE 9 is two complete frames of shift ring 25 when the armature 47 of the differential transformer 21 would be at 45 degrees as shown by the wave form diagram FIGURE 4.

The pulse train output of the coding unit 33 is useful for telemetering, recording on a suitable medium such as magnetic tape, or monitoring and checking.

The input to shift ring 25 may also be a single train of time spaced pulses applied thru the decoding unit 32. In this mode of operation the single train of time spaced pulses would be of the nature of the output of the coding unit 33, as described above.

In the pulse input mode of operation, ring stages 26, 27, 28 and 29 are electronic switches capable of two states; "off" and "on." In this case the "on" time of a stage is determined by the time spacing of the pulses arriving at the decoding unit 32. One pulse arriving at the decoding unit 32 turns ring stage 26 "off" and ring stage 27 "on," the next pulse arriving at the decoding unit 32 turns ring stage 27 "off" and ring stage 28 "on," the next pulse arriving at the decoding unit 32 turns ring stage 28 "off" and ring stage 29 "on," the next pulse arriving at the decoding unit 32 turns ring stage 29 "off" and ring stage 26 "on." It is apparent that the output of the pulse controlled shift ring will be a faithful reproduction of the shift ring originating the train of pulses. Thus power amplifiers 31a, 31b, 31c and 31d, and motor 34 will operate in the same manner as described in the first mode of operation.

As will later be explained in detail in conjunction will FIGURE 5, switch systems in ring stages 26, 27, 28 and 29 will permit shift ring 25 to be used for either mode of operation or, where desirable, specific shift rings may be constructed for either mode of operation.

Figure 2:
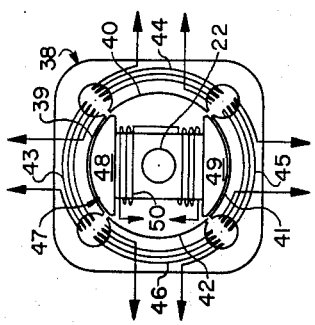
FIGURE 2 is a diagram of a differential transformer, shown in FIGURE 1, used to convert rotational mechanical information into electrical information.

FIGURE 2 is a diagram of a differential type transformer suitable for converting rotary movement into electrical information. Differential transformers of this type are well known to those skilled in the art and one is described here only as part of the system of this invention. Such a differential transformer comprises a stator element 38, its inner periphery forming a plurality of poles 39, 40, 41 and 42 about which are wound coils 43, 44, 45 and 46. A rotor element 47 affixed to a shaft 22 is supported by a frame and bearings, not shown, in such a manner that rotor element 47 may rotate freely within the inner periphery of the stator element 38. The rotor element is shaped so as to form poles 48 and 49 and about which is wound a coil 50. The terminals of the coil 50 are connected to a system of slip rings and brushes, permitting continuous electrical connection with coil 50 during rotation of the shaft 22 and rotor element 47.

Figure 3:
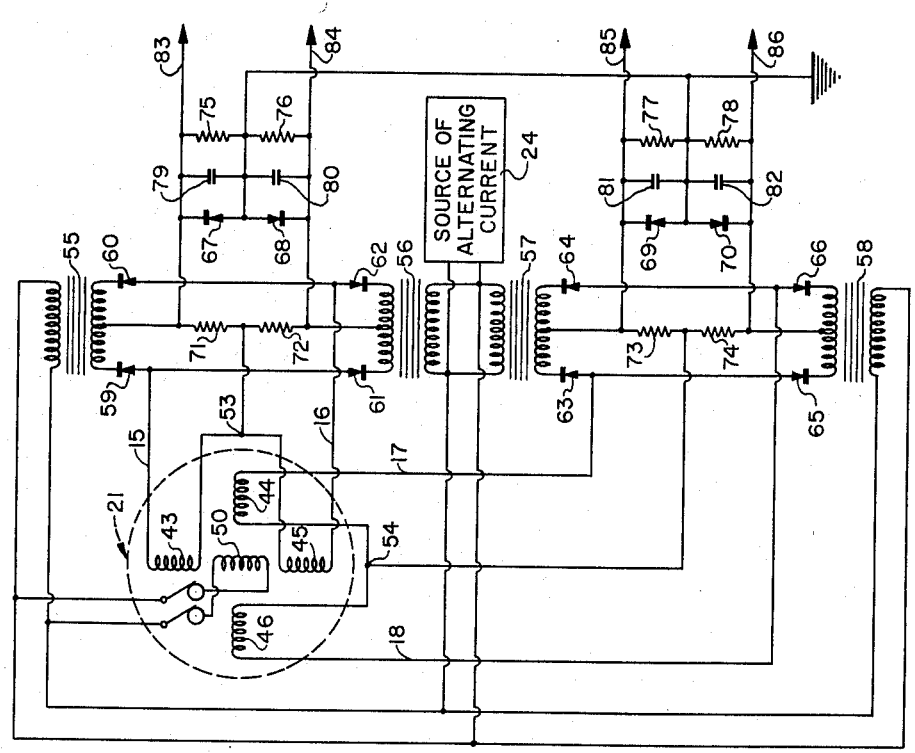
FIGURE 3 is a schematic diagram of the circuitry used in conjunction with the differential transformer shown in FIGURE 2.

As shown in FIGURE 3, the stator coils of the differential transformer 21 are connected in the following manner; coil 43 is connected in series with coil 45 forming a junction 53. In like manner coils 44 and 46 are connected in series forming junction 54. When the rotor coil 50 is energized by a source of alternating current, an alternating current will be induced in two or more coils of the stator element 38. The magnitude of this induced alternating current in the stator coils involved will depend on the proximity of the rotor poles 48 and 49 to the poles of the stator 38. Assume rotor poles 48 and 49 are aligned with stator poles 39 and 41 as shown in FIGURE 2 and that this alignment represents zero degrees rotation. In this position maximum alternating current will be induced in coils 43 and 45 and no current will be flowing in coils 44 and 46. If rotor 47 is rotated 90° in either direction, maximum alternating current will be induced in coils 44 and 46 while no current will flow in coils 43 and 45. In all position other than direct alignment of rotor poles 48 and 49 with a pair of stator poles, current will be induced in both sets of stator coils 43 and 45, and 44 and 46. The magnitude of the currents induced in the stator coils will vary in a substantially sinusoidal manner from maximum to zero in proportion to the angular relationship that the rotor poles 48 and 49 assume to the said stator poles. For any 180° rotation of the rotor 47 the the magnitude of the induced currents in the stator windings will be the same, but the polarity will be opposite.

A plurality of transformers 55, 56, 57 and 58 are shown in FIGURE 3, each having a primary winding and center tapped secondary winding. While shown as four separate transformers for sake of illustration, one transformer with a common primary and four center tapped secondaries will perform equally well.

The primaries of transformers 55, 56, 57 and 58 are energized by the same source of alternating current 24 used to energize coil 50 of the differential transformer 21. Each center tapped secondary of transformers 55, 56, 57 and 58 is wound to produce a voltage equal to the maximum output voltage of coils 43 and 45, or coils 44 and 46 of the differential transformer 21.

With the rotor 47 in zero position as described and shown in FIGURE 2, maximum voltage will be induced in coils 43 and 45. When the primaries of transformers 55 and 56, and the rotor coil 50 are properly connected to the source of alternating current 24, at a given instant assume the following conditions: the outer lead 15 of coil 43 will be positive; the outer lead 16 of coil 45 will be negative; the lead of the secondary of transformer 55 connected to diode 60 will be positive; the lead of the secondary of transformer 55 connected to diode 59 will be negative; the lead of the secondary of transformer 56 connected to diode 62 will be negative and the lead of the secondary of transformer 56 connected to diode 61 will be positive. Under these conditions diode 59 will conduct and a current will flow thru the half of the secondary of transformer 55 connected to diode 59 thru coil 43 and cause a voltage to develop across resistor 71. The polarity of the voltage developed across resistor 71 will be positive at the end connected to the center tap of the secondary of transformer 55 and negative at the end connected to junction 53.

With the reversal of polarity of the source of alternating current 24, the polarity of the coils described above will also reverse causing a current to flow thru diode 60, coil 45 and resistor 71; the polarity of the voltage developed across resistor 71 being the same as described above. Because of mutual polarities of the coils involved or the blocking actions of diodes 59, 60, 61 or 62, currents other than described will not flow under the conditions just described. A secondary path for current flow does exist in connection with the voltage developed across resistor 71. In accordance with the polarities of the voltage across resistor 71 as stated, diode 68 will conduct while diode 67 will block, causing current to flow thru resistors 75 and 72. The useful output of this circuit is the voltage developed across resistor 75 and appears as a positive voltage at output terminal 83. In like manner, depending on the angular position of the rotor 47 of the differential transformer 21, useful voltages may be developed across resistors 76, 77 and 78 and appear at output terminals 84, 85 and 86. This may be more clearly understood by referring to FIGURE 4, the wave forms shown being the voltages appearing at corresponding output terminals 83, 84, 85 and 86. Capacitors 79, 80, 81 and 82 serve to filter the rectified pulses of the circuit into substantially smooth wave forms.

When the outputs of the phase detector and rectifier 23 are used to feed high impedance circuits, the resistance of resistors 71, 72, 73, 74, 75, 76, 77 and 78 may be high, and with the proper design of differential transformer 21, the electrical power consumed by the system will be low. Thus, the mechanical power required to rotate shaft 22 will be mainly to overcome the friction of the bearings supporting shaft 22 and the friction of the slip rings used to supply coil 50.

Ring stages 26 and 27 of shift ring 25 are clearly shown in FIGURE 5. A multiple section switch 100, comprised of switches 100a, 100b, 100c and 100d is incorporated in the ring stages 26, 27, 28 and 29 in such a manner as to determine the type of input that will be used to operate shift ring 25 in the prescribed manner. With switch 100 in the position shown in FIGURE 5, the input will be from the phase detector and rectifier 23 and the differential transformer 21 previously described. In that the functions of ring stages 26, 27, 28 and 29 are identical in this mode of operation, ring stage 26 will be described. In ring stage 26, triodes 101a and 102a and associated circuitry function as a version of the well known "monostable" or "single trigger" multivibrator. In the quiescent state triode 102a will be cut off. When a negative pulse is applied to the grid of triode 101a, conduction thru triode 101a will drop, causing the voltage at the plate of triode 101a to rise. Part of this voltage is conducted to the grid of triode 102a thru capacitor 114a and resistor 115a, causing triode 102a to conduct. Conduction by triode 102a causes a voltage drop at the plate of triode 102a and this voltage drop is conducted to the grid of triode 101a thru capacitor 107a and resistor 106a, reinforcing the original negative trigger pulse until triode 101a is cut off and triode 102a is conducting. This action is regenerative resulting in rapid changes in the states of triodes 101a and 102a. As capacitor 114a charges thru resistor 117a, the positive potential at the grid of triode 102a decreases until a point is reached where triode 102a can no longer maintain control of the circuit. At this point the regenerative switch action described above occurs in reverse and the multivibrator returns to the quiescent state.

The "off" time of any of the ring stages 26, 27, 28 or 29 corresponds to the quiescent state of the multivibrator within the ring stage, while the "on" time of any of the ring stages 26, 27, 28 or 29 corresponds to the period when triode 101a, 101b, 101c or 101d of the multivibrator within the stage is cut off.

The "on" time of ring stage 26 may be controlled by a voltage applied to the junction of resistors 117a and 75. The "on" time of ring stage 26 may also be controlled to a lesser degree by the position of the slider of potentiometer 109a. For purpose of illustration, and with the circuit component specifications given below, the slider of potentiometer 109a is set so that the "on" time of ring stage 26 will be 25 micro-seconds with zero voltage across resistor 75. The "on" time of ring stage 26 will vary almost linearly with the voltage appearing on terminal 83 to a maximum of 20 volts which equals an "on" time of approximately 450 micro-seconds.

One useful output of the multivibrator of ring stage 26 is taken from the plate of triode 101a and coupled to the grid of triode 103a by capacitor 118a. Triode 103a serves as an output coupling device for ring stage 26. Triode 103a is normally held at cutoff by bias voltage 124. When triode 101a of the multivibrator stage is triggered to cut off as described above, the positive rectangular wave developed at the plate of triode 101a causes 103a to conduct and the following results occur; the negative rectangular wave appearing at the plate of triode 103a is fed to the coding unit 33 by conductor 140 and the positive rectangular wave developed at the junction of resistors 121a and 122a is used to control the power amplifier 31a.

A second useful output of the multivibrator of ring stage 26 is taken from the junction of potentiometer 109a and resistor 126a. The trailing edge of the wave caused by the multivibrator of ring stage 26 turning off, is applied as a negative pulse to the grid of triode 101b thru capacitor 111b and diode 112b, initiating a switching action in ring stage 27 similar to that described in ring stage 26.

For purpose of illustration and to satisfy the above conditions the following specifications of components are given; triodes 101a, 102a and 103a are each one half of a 12AU7 dual triode; resistor 104a is 15,000 ohms; capacitor 105a is .1 micro-farad; resistor 106a is 220 kilo-ohms; capacitor 107a is 50 micromicro-farads; resistor 108a is 120 kilo-ohms; potentiometer 109a is 10,000 ohms; resistor 110a is 22,000 ohms; capacitor 111a is 50 micromicro-farads; diodes 112a and 113a are type IN34A; capacitor 114a is .0015 micro-farad; resistor 115a is 100 kilo-ohms; diode 116a is type IN483A; resistor 117a is 1 meg-ohm; capacitor 118a is .05 micro-farad; resistor 119a is 470 kilo-ohms; diode 120a is type IN38B; resistor 121a is 4,700 ohms; resistor 122a is 150 ohms; resistor 123a is 470 ohms; D.C. bias 124 is 18 volts; D.C. voltage supply 125 is 150 volts; and resistor 126a is 12,000 ohms.

Corresponding components in ring stages 27, 28 and 29 will have similar specifications.

In normal operation ring stage 26 turning off will trigger ring stage 27 to "on," ring stage 27 turning off will trigger ring stage 28 to "on," ring stage 28 turning off will trigger ring stage 29 to "on," and ring stage 29 turning off will trigger ring stage 26 to "on," as described above when switch 129 is in the position shown in FIGURE 5. However, during warm-up, when power is applied, the multivibrator of shift ring 25 may be erratic in performance. Also, at times, it may be desirable to stop the sequence switching of shift ring 25. For this purpose switch 129 has been shown in FIGURE 5 in the connector 130 between shift ring 29 and shift ring 26. In the position switch 129 is shown, normal sequence switching of shift ring 25 will continue. When switch 129 is changed to its alternate position, switching of shift ring 25 will stop; all multivibrators of shift ring 25 will return to the quiescent state and when resistor 127 is 50 kilo-ohms and resistor 128 is 100 kilo-ohms, capacitor 111a will charge to approximately 50 volts higher than the voltage at the cathodes of triodes 101a and 102a. When switch 129 is returned to the position shown in FIGURE 5, capacitor 111a will discharge thru diode 112a and resistor 108a, causing a negative pulse to appear at the grid of triode 101a and triggering ring stage 26 to the "on" state. The sequence of triggering of shift ring 25 will continue in the manner described.

The output terminals 144, 145, 146 and 147 of ring stages 26, 27, 28 and 29 are connected to power amplifiers 31a, 31b, 31c and 31d as shown in FIGURE 7. Said power amplifiers are identical as to components and method of operation. When ring stage 26 is in the "off" state, P-N-P transistor 150a is biased to saturation by the current thru resistor 152a connected to the negative power supply bus 167. In this state no current is present at the base of P-N-P transistor 151a and this transistor is cut off. For the specifications of the components given, there will be a delay of approximately 40 micro-seconds after ring stage 26 turns on before the positive rectangular pulse applied to the base of transistor 150a cuts this transistor off. This delay will prevent power amplifier 31a from turning on during the minimum or shift time of 25 micro-seconds of ring stage 26 described above. When ring stage 26 is in the "on" state for a period of time greater than 40 micro-seconds, transistor 150a will be driven to cutoff by the positive voltage developed across resistor 122a for the period of time ring stage 26 is on, minus the approximately 40 micro-seconds delay time of the input of transistor 150a. When transistor 150a is cut off, most of the potential of the negative supply bus 167 is conducted to the base of transistor 151a thru resistor 153a and diode 154a, causing a potential almost equal to that between bus 167 and ground to appear at the emitter of transistor 151a and across motor coil 163. Capacitor 156a serves to control the trailing edge of the semi-rectangular wave developed across the inductive motor coil 163, while diode 154a prevents capacitor 156a from being discharged by transistor 150a switching to the saturated state.

The following component specifications will satisfy the above conditions when the voltage between the supply bus 167 and ground does not exceed 30 volts; P-N-P transistor 150a is type 2N307; resistor 152a has a value of 2200 ohms; resistor 153a has a value of 150 ohms; resistor 155a has a value of 2700 ohms; capacitor 156a has a value of .01 micro-farad and diode 154a is type IN483A.

Output motor 34 is a synchronous type motor. As is well known to those skilled in the art, a conventional two phase synchronous motor comprises a set of coils 90 electrical degrees apart. When a two phase alternating current is properly applied to said set of coils, magnetic flux patterns will be created so as to cause the rotor of the synchronous motor to follow substantially in step with the flux patterns created. If the set of coils in a conventional synchronous motor are center tapped, coils 163, 164, 165 and 166 as shown in FIGURE 7 will be formed; conductor 168 connecting the common center taps of said coils to a direct current voltage supply 162. When power is supplied to the coils 163, 164, 165 and 166 of motor 34 by the power amplifiers 31a, 31b, 31c and 31d controlled in the manner of the system described, the mechanical output of motor 34 will be a useful reproduction of the mechanical input to the differential transformer 21.

When the differential transformer 21 is at standstill, the electrical outputs of said power amplifiers will be supplying one or two of the coils of motor 34. As the full power output may be to only one of coils 163, 164, 165 or 166, the power output of the system must be limited to the safe power dissipation of any one of said coils. As is well known to those skilled in the art, when output motor 34 is caused to rotate, the impedance of the motor coils 163, 164, 165 and 166 will rise in almost direct proportion to the speed of motor 34. Thus, if the power supplied by bus 167 were constant, motor 34 would rapidly lose torque as speed is increased. A series current regulator comprising transistor 157, Zener diode 158 and resistors 160 and 161 serves to regulate the output of the direct voltage supply 162 so that a nearly constant amperage is supplied to motor coils 163, 164, 165 and 166 within the working speed range of the system. The current regulator described is only one of many types which may be used. Further, by varying the degree of control a wide range of speed versus torque or speed versus horsepower relationships may be obtained.

The type of transistors shown as 151a, 151b, 151c, 151d and 157, the circuitry of the series current regulator, and the power output of the direct current voltage supply 162 will depend on the power dissipation of motor coils 163, 164, 165 and 166, and the power and speed range of output motor 34.

The coding unit 33 as shown in block form in FIGURE 1 is shown as a schematic diagram in FIGURE 8. The rectangular waves developed across resistors 123a, 123b, 123c and 123d are differentiated by capacitors 170a, 170b, 170c and 170d, and are rectified by associated diodes 171a, 171b, 171c and 171d so as to cause a single train of pulses to develop across resistor 173, each pulse coinciding with the turning on of ring stages 26, 27, 28 or 29. The output terminal 174 may be connected to suitable recording equipment whereby said pulses may be recorded for play back at a future time, or to suitable transmission equipment for telemetering said pulses to another place.

In the second mode of operation of this invention, the input to the system is a single train of pulses previously developed and transcribed by the coding method described above, or by any other suitable means. Moving switch 100 shown in FIGURE 5 to the alternate position will change the ring circuits of ring stages 26, 27, 28 and 29 so that the multivibrators comprising triodes 101a, 101b, 101c and 101d and 102a, 102b, 102c and 102d, and associated circuitry of said stages becomes the well known "bistables" or "flip-flop" of multivibrators. The multiple section switch 139, comprised of switches 139a, 139b, 139c, 139d and 139e, is closed momentarily to insure proper phasing of the "flip-flop" multivibrators of ring stages 26, 27, 28 and 29 and the decoding unit 32 "flip-flop" multivibrator. When switch 139a is closed, a more negative than normal potential is applied to the grid of triode 101a, insuring that triode 101a will be cut off. The voltage at the plate of triode 101a will be high and part of this voltage, applied to the grid of triode 102a by the voltage divider comprised of resistors 131a and 133a, will cause triode 102a to be in a state of conduction. In like manner, the momentary closing of switch 139b will cause triode 102b to be cut off and triode 101b to conduct. In ring stages 28 and 29, switches 139c and 139d will be in the grid circuits of triodes 102c and 102d so these multivibrators will assume the same phase as the multivibrator in ring stage 27. Once said multivibrators have been phased, switch 139 may be opened, and said multivibrators will remain in the state described until triggered by external pulses.

Figure 6:
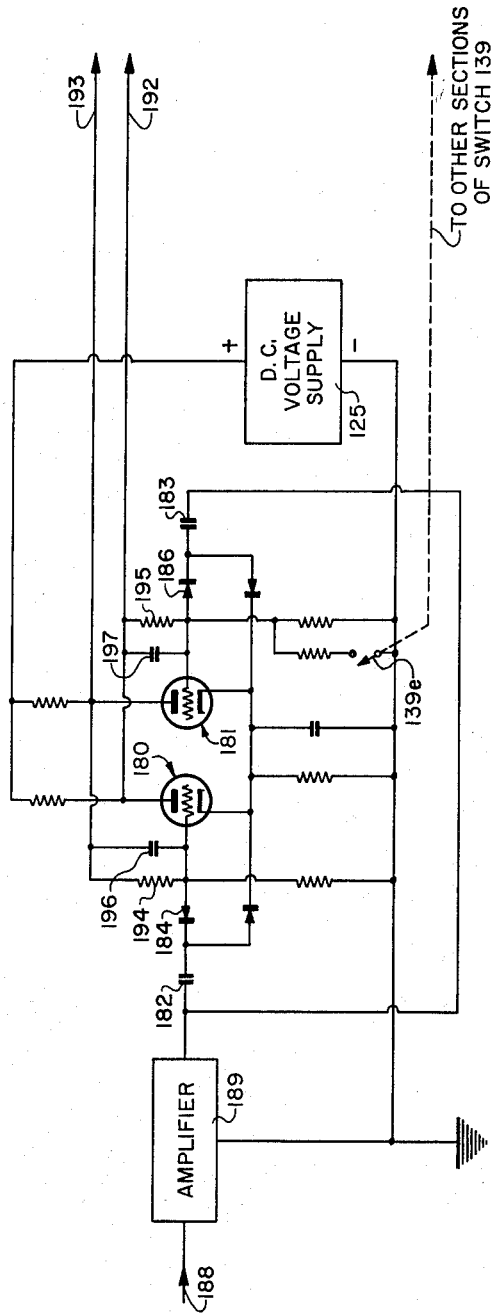
FIGURE 6 is a schematic diagram of the decoding unit shown in block form in FIGURE 1.

The decoding unit 32 shown in block form in FIGURE 2 is shown as a a schematic diagram in FIGURE 6. Triodes 180 and 181 and associated circuitry comprise a "bi-stable" or "flip-flop" multivibrator. When switch 139e is momentarily closed triode 181 will cut off and triode 180 will conduct in a manner similar to that described above. When switch 139e is opened the decoder 32 will remain in said state until triggered by an external pulse.

When a train of pulses, such as developed by the coding unit 33, or any other suitable means, is applied to terminal 188 and amplified by a suitable amplifier 189 so that said pulses are of suitable amplitude and of a negative polarity, said pulses will be applied to the grids of triodes 180 and 181 thru capacitors 182 and 183 and diodes 184 and 186. As triode 181 is cutoff, a negative pulse to the grid of triode 181 will have no effect, but a negative pulse applied to the grid of triode 180, which is conducting, will cause the voltage at the plate of triode 180 to rise. Part of the rising plate voltage of triode 180 is applied to the grid of triode 181 thru resistor 195 and capacitor 197 causing the voltage at the plate of triode 181 to decrease. Part of this decreasing voltage, applied to the grid of triode 180 thru resistor 194 and capacitor 196 reinforces the original negative pulse applied to the grid of triode 180. This results in a regenerative action causing triode 180 to cutoff and triode 181 to conduct. The next negative pulse of the train applied to terminal 188 will cause triode 180 to conduct and triode 181 to cutoff in a similar manner.

The voltage drop at the plate of triode 181 when this triode is triggered to conduction constitutes a negative rectangular wave form applied to the grid circuits of even numbered ring stages 26 and 28 by conductor 193. Momentary closing of switches 139a and 139c has caused triode 102a to conduct while triode 102a or ring stage 28 will be cutoff as explained. Thus, the negative wave to the grid circuit of triode 102c will have no effect, but the negative wave to the grid circuit of triode 102a, differentated by capacitor 134a, will apply a negative pulse to the grid of triode 102a, starting the "flip-flop" switching action that cuts off triode 102a and causes triode 101a to conduct. The negative rectangular wave appearing at the junction of potentiometer 109a and resistor 126a, caused by the conduction of triode 101a, is differentiated by capacitor 111b and applied as a negative pulse to the grid of triode 101b. This in turn causes the "flip-flop" action whereby triode 101b is cutoff and 102b is conducting. This state continues until the next pulse from amplifier 189 causes a negative rectangular wave to develop on conductor 192 and appear at the grid circuits of triodes 102b and 102d in odd ring stages 27 and 29. As triode 102b is conducting and triode 102d is cutoff, only triode 102b will switch in the manner described in conjunction with the "flip-flop" or ring stage 26 described above. This method of operation causes a repetitive switching action in shift ring 25.

In the pulse train mode of operation, the spacing in time between pulses is equivalent to the "on" times of ring stages 26, 27, 28 and 29 of the first mode of operation; therefore the "on" time of said ring stages will be the same in both modes of operation. Therefore the functions of triodes 103a, 103b, 103c and 103d as well as of the power amplifiers 31a, 31b, 31c and 31d, and the mechanical output of motor 34 will be the same in both modes of operation. Furthermore, in telemetered applications, a coding unit 33 may be included in the second mode of operation in the same manner as described in the first mode of operation, and where desired, this information may be returned to the point of originating information for purposes of synchronzing or monitoring.

From the examples given, it will be obvious to those skilled in the art, that with proper changes in the input and output devices and the proper number of stages in the shift ring and the proper number of associated amplifiers, other polyphase systems are possible.

In that the order and degree of response of the amplifiers is independent of the natural switching sequence of the shift ring, other electrically responsive devices may be operated in any desired order by the system of this invention. A suitable signal may be applied to the input of one or more stages of the shift ring in any order by a suitable switching system controlling both the degree and order of response of the said output devices.

What is claimed is:

1. A system for controlling the movement of a mechanism in response to discrete sets of pulses, embodying a means for generating said discrete sets of pulses, amplifier means for amplifying said discrete sets of pulses, means for causing said amplifiers to be unresponsive to pulses of a shorter than pre-determined length of time and means comprising a synchronous type motor for converting said amplified discrete sets of pulses into mechanical movement.

2. A system for controlling the movement of a mechanism in response to discrete sets of pulses, embodying a means for converting input mechanical movement into a plurality of electrical signals, a means for converting said electrical signals into sets of pulses whereby the duration of said pulses are proportional to the magnitude of said electrical signals, amplifier means for amplifying said discrete sets of pulses, means for causing said amplifiers to be unresponsive to pulses of a shorter than pre-determined length of time and means for converting said amplified sets of pulses into mechanical movement.

3. A system for controlling the movement of a mechanism in response to discrete sets of pulses, embodying a means for converting input mechanical movement into a plurality of electrical signals of varying amplitudes, a means for converting said electrical signals into sets of pulses whereby the duration of said pulses are proportional to the magnitude of said electrical signals, amplifier means for amplifying said discrete sets of pulses, means for causing said amplifiers to be unresponsive to pulses of a shorter than pre-determined length of time and means for converting said amplified sets of pulses into mechanical movement, said mechanical movement having a smooth, stepless synchronous relationship to the said input mechanical movement.

4. A system for controlling the movement of a mechanism in response to discrete sets of pulses, embodying a rotating differential transformer comprising a wound rotor and further having a plurality of wound stator poles angularly spaced about the axis of rotation of the rotor, a source of alternating current to energize said wound rotor, a means for determining the phase of the currents induced in the said stator windings by the said energized wound rotor, a means for rectifying specific phases of the currents induced in the said stator windings for the purpose of establishing a plurality of consequential electrical signals when the said wound rotor is caused to rotate, said consequential electrical signals varying in magnitude determined by the proximity of the said wound rotor to the said stator windings, and further, for the purpose of establishing one or more stable electrical signals when the said wound rotor is at standstill, said system embodying a means for converting said electrical signals into sets of pulses whereby the duration of said pulses are proportional to the magnitude of said electrical signals, amplifier means for amplifying said discrete sets of pulses, means for causing said amplifiers to be unresponsive to pulses of a shorter than pre-determined length of time and means for converting said amplified sets of pulses into mechanical movement.

5. A system for controlling the movement of a mechanism in response to discrete sets of pulses, embodying a rotating differential transformer comprising, a wound rotor and further having a plurality of wound stator poles angularly spaced about the axis of rotation of the rotor, a source of alternating current to energize said wound rotor, a means for determining the phase of the currents induced in the said stator windings by the said energized wound rotor, a means for rectifying specific phases of the currents induced in the said stator windings for the purpose of establishing a plurality of consequential electrical signals when the said wound rotor is caused to rotate, said consequential electrical signals varying in magnitude determined by the proximity of the said wound rotor to the said stator windings, and further, for the purpose of establishing one or more stable electrical signals when the said wound rotor is at standstill, said system embodying a shift ring, comprising a plurality of monostable multivibrators, each having a quiescent and an alternate state, said shift ring embodying means whereby one multivibrator returning to the quiescent state will trigger the succeeding multivibrator to the alternate state so that a continuous pattern of switching is caused within the shift ring, said shift ring further embodying means whereby the period of time the multivibrators remain in the alternate state is proportional to the magnitude of the electrical signal impressed on the circuit of the said multivibrator, the said shift ring embodying means whereby each multivibrator generates a series of electrical pulses, the duration of the electrical pulses being the period of time the multivibrator is in the alternate state, the time between pulses being the time other multivibrators of the shift ring are in the alternate state, said system embodying amplifier means for amplifying said discrete sets of pulses, means for causing said amplifiers to be unresponsive to pulses of a shorter than pre-determined length of time and means for converting said amplified sets of pulses into mechanical movement.

6. A system for controlling the movement of a mechanism in response to discrete sets of pulses, embodying a rotating differential transformer comprising a wound rotor and further having a plurality of wound stator poles angularly spaced about the axis of rotation of the rotor, a source of alternating current to energize said wound rotor, a means for determining the phase of the currents induced in the said stator windings by the said energized wound rotor, a means for rectifying specific phases of the currents induced in the said stator windings for the purpose of establishing a plurality of consequential electrical signals when the said wound rotor is caused to rotate, said consequential electrical signals varying in magnitude determined by the proximity of the said wound rotor to the said stator windings, and further, for the purpose of establishing one or more stable electrical signals when the said wound rotor is at standstill, said system embodying a shift ring, comprising a plurality of monostable multivibrators, each having a quiescent and an alternate state, said shift ring embodying means whereby one multivibrator returning to the quiescent state will trigger the succeeding multivibrator to the alternate state so that a continuous pattern of switching is caused within the shift ring, said shift ring further embodying means whereby the period of time the multivibrators remain in the alternate state is proportional to the magnitude of the electrical signal impressed on the circuit of the said multivibrator, the said shift ring embodying means whereby each multivibrator generates a series of electrical pulses, the duration of the electrical pulses being the period of time the multivibrator is in the alternate state, the time between pulses being the time other multivibrators of the shift ring are in the alternate state, said system embodying one amplifier unit and a suitable coupling net work for each multivibrator of the said shift ring, said amplifier unit embodying means whereby pulses of a shorter than predetermined time will not cause response by the said amplifier, but pulses longer than the pre-determined time will gate the said amplifier, raising the power of the said pulses to a suitable level, said system embodying means for converting said amplified sets of pulses into mechanical movement.

7. A system for controlling the movement of a mechanism according to claim 6, wherein said means for converting said amplified sets of pulses into mechanical movement is a synchronous type motor.

8. A system for controlling the movement of a mechanism according to claim 6, wherein said means for converting said amplified sets of pulses into mechanical movement is a synchronous type motor, including means whereby the power input to said synchronous type motor is proportional to the speed of said synchronous type motor.

9. A system for controlling the movement of a mechanism according to claim 6, including in addition a means for converting the sets of pulses generated by the shift ring into a single series of pulses suitable for recording or telemetering.

10. A system for controlling the movement of a mechanism in response to discrete sets of pulses, embodying a means for converting input mechanical movement into a plurality of electrical signals of varying amplitudes, a means for converting said electrical signals into sets of pulses whereby the duration of the pulses in said sets of pulses are proportional to the magnitude of said electrical signals, means for converting said sets of pulses into a series of pulses, means for reproducing said series of pulses, shift ring means for converting said series of pulseh into second sets of pulses, amplifier means for amplifying said second sets of pulses, means for causing said amplifiers to be unresponsive to pulses of a shorter than pre-determined length of time and means for converting said second sets of amplified pulses into mechanical movement.

11. A system for controlling the movement of a mechanism in response to discrete sets of pulses, embodying means of reproducing a series of coded pulses generated by any suitable means, shift ring means for converting said series of coded pulses into sets of pulses, amplifier means for amplifying said sets of pulses, means for causing said amplifiers to be unresponsive to pulses of a shorter than pre-determined length of time and means for converting said amplified sets of pulses into mechanical movement.

12. A system for controlling the speed and direction of movement of a mechanism in response to discrete sets of pulses, embodying means for reproducing a series of coded pulses generated by any suitable means, shift ring means for converting said series of coded pulses into sets of pulses, amplifier means for amplifying said sets of pulses, means for causing said amplifiers to be unresponsive to pulses of a shorter than predetermined length of time and means for converting said amplified sets of pulses into mechanical movement.

13. A pulse control system, comprising means for controlling the reaction of a plurality of electrically responsive devices in any desired order in response to discrete sets of pulses, said means embodying means for converting useful information into a plurality of electrical signals, shift ring means for converting said electrical signals into sets of pulses, the duration of the pulses in the said sets of pulses being proportional to the magnitude of the said electrical signals, amplifier means for amplifying said sets of pulses, means for causing said amplifiers to be unresopnsive to pulses of a shorter than pre-determined length of time and a suitable electrical network to conduct said amplified sets of pulses to said electrically responsive devices.

14. A pulse control system, comprising means for controlling the reaction of a plurality of electrically responsive devices in any desired order in response to a series of coded pulses, said means embodying means for generating said series of coded pulses, means for reproducing said series of coded pulses, means for converting said series of pulses into sets of pulses, amplifier means for amplifying said sets of pulses, means for causing said amplifiers to be unresponsive to pulses of a shorter than pre-determined length of time and a suitable electrical network to conduct said amplified sets of pulses to said electrically responsive devices.

References Cited in the file of this patent

UNITED STATES PATENTS

| | | |
|---|---|---|
| 2,623,203 | DeMuth | Dec. 23, 1952 |
| 2,727,199 | Ogle | Dec. 13, 1955 |
| 2,784,365 | Fenemore et al. | Mar. 5, 1957 |
| 2,791,734 | Kieffert | May 7, 1957 |